(12) United States Patent
Noll et al.

(10) Patent No.: US 7,967,877 B2
(45) Date of Patent: Jun. 28, 2011

(54) BIOMASS ENERGY PRODUCT AND PROCESSING METHOD

(75) Inventors: Anthony P. Noll, Covington, KY (US); Herbert A. Ligon, Nashville, TN (US)

(73) Assignee: Biomass Worldwide Group Limited, Greater Manchester (GB)

( * ) Notice: Subject to any disclaimer, the term of this patent is extended or adjusted under 35 U.S.C. 154(b) by 627 days.

(21) Appl. No.: 11/296,585

(22) Filed: Dec. 6, 2005

(65) Prior Publication Data

US 2006/0112616 A1 Jun. 1, 2006

Related U.S. Application Data

(63) Continuation-in-part of application No. 10/713,557, filed on Nov. 13, 2003, now abandoned.

(51) Int. Cl.
*C10L 5/40* (2006.01)

(52) U.S. Cl. ........... 44/589; 44/590; 44/593; 44/596; 44/597; 44/605; 44/606

(58) Field of Classification Search ............ 44/589, 44/550, 590, 593, 596, 597, 605, 606; 210/603; 241/1; 439/139; 585/638
See application file for complete search history.

(56) References Cited

U.S. PATENT DOCUMENTS

| | | | |
|---|---|---|---|
| 742,226 A | 10/1903 | Peck et al. |
| 1,938,647 A | 12/1933 | Earp-Thomas |
| 2,317,992 A | 5/1943 | Grether |
| 2,823,106 A | 2/1958 | Pierson |
| 2,969,277 A | 1/1961 | Carlsson et al. |
| 3,055,744 A | 9/1962 | Peterson |
| 3,057,769 A | 10/1962 | Sandberg |
| 3,070,156 A | 12/1962 | Starrett |
| 3,235,369 A | 2/1966 | Eweson |
| 3,236,604 A | 2/1966 | Pierson |
| 3,524,594 A | 8/1970 | Anderson et al. |
| 3,549,010 A | 12/1970 | Marsh et al. |
| 3,549,092 A | 12/1970 | Baxter, Jr. |
| 3,587,851 A | 6/1971 | Anderson |
| 3,595,488 A | 7/1971 | Blakley et al. |
| 3,597,308 A | 8/1971 | Brooks |
| 3,643,797 A | 2/1972 | Berkowitz et al. |
| 3,668,286 A | 6/1972 | Brooks et al. |

(Continued)

FOREIGN PATENT DOCUMENTS

EP 0277507 A2 1/1993

(Continued)

OTHER PUBLICATIONS

International Bureau, Notification Concerning Transmittal of International Preliminary Report on Patentability, Written Opinion of the International Searching Authority, International Preliminary Report, International Application No. PCT/US2007/061827, Aug. 28, 2008 date of mailing, 6 pages.

United States Patent and Trademark Office, Official Action directed to U.S. Appl. No. 11/296,586, mailed Sep. 4, 2008, 16 pages.

United States Patent and Trademark Office, Official Action directed to U.S. Appl. No. 10/713,557, maield Nov. 13, 2003, 9 pages.

(Continued)

*Primary Examiner* — Ellen M McAvoy
*Assistant Examiner* — Latosha Hines
(74) *Attorney, Agent, or Firm* — Wood, Herron & Evans, LLP

(57) ABSTRACT

An energy product made from biomass, and a method of making an energy product from biomass. The energy product is made by processing biomass in a pressurizable reaction vessel with heat, pressure and agitation.

22 Claims, 2 Drawing Sheets

U.S. PATENT DOCUMENTS

| | | |
|---|---|---|
| 3,714,038 A | 1/1973 | Marsh |
| 3,725,538 A | 4/1973 | Brewer |
| 3,736,223 A | 5/1973 | Marsh |
| 3,741,863 A | 6/1973 | Brooks |
| 3,833,117 A | 9/1974 | Mackenzie et al. |
| 3,849,246 A | 11/1974 | Raymond et al. |
| 3,932,166 A | 1/1976 | Vignovich et al. |
| 3,933,577 A | 1/1976 | Penque |
| 3,939,286 A | 2/1976 | Jelks |
| 3,961,913 A | 6/1976 | Brenneman et al. |
| 3,993,577 A | 11/1976 | Black et al. |
| RE029,156 E | 3/1977 | Marsh |
| 4,010,098 A | 3/1977 | Fassell |
| 4,033,907 A | 7/1977 | Wolf |
| 4,044,695 A | 8/1977 | Mackenzie et al. |
| 4,056,380 A | 11/1977 | Thiac |
| 4,079,837 A | 3/1978 | Grube et al. |
| 4,106,627 A | 8/1978 | Watanabe et al. |
| 4,111,800 A | 9/1978 | Harendza-Harinxma |
| 4,152,119 A | 5/1979 | Schulz |
| 4,157,961 A | 6/1979 | Borst |
| 4,185,680 A | 1/1980 | Lawson |
| 4,225,457 A | 9/1980 | Schulz |
| 4,235,707 A | 11/1980 | Burke, Jr. |
| 4,264,352 A | 4/1981 | Houser |
| 4,297,322 A | 10/1981 | Liu |
| 4,312,701 A | 1/1982 | Campbell |
| 4,321,150 A | 3/1982 | McMullen |
| 4,342,830 A | 8/1982 | Holloway |
| 4,368,079 A | 1/1983 | Rugg et al. |
| 4,440,635 A | 4/1984 | Reiniger |
| 4,461,648 A | 7/1984 | Foody |
| 4,465,591 A | 8/1984 | Holz et al. |
| 4,468,256 A | 8/1984 | Hinger |
| 4,478,644 A | 10/1984 | Berger et al. |
| 4,483,704 A | 11/1984 | Easter, II |
| 4,540,467 A | 9/1985 | Grube et al. |
| 4,540,495 A | 9/1985 | Holloway |
| 4,566,942 A | 1/1986 | Holz et al. |
| 4,570,861 A | 2/1986 | Zentgraf et al. |
| 4,607,797 A | 8/1986 | Enikolopow et al. |
| 4,632,729 A | 12/1986 | Laakso |
| 4,637,835 A | 1/1987 | Nagle |
| 4,650,125 A | 3/1987 | Pellhammer |
| 4,699,632 A | 10/1987 | Babu et al. |
| 4,750,437 A | 6/1988 | Rouse |
| 4,816,117 A | 3/1989 | Pfalzer et al. |
| 4,836,918 A | 6/1989 | Szikriszt |
| 4,842,877 A | 6/1989 | Tyson |
| 4,844,351 A | 7/1989 | Holloway |
| 4,925,571 A | 5/1990 | Jacob et al. |
| 4,949,653 A | 8/1990 | Rast |
| 4,974,781 A | 12/1990 | Placzek |
| 4,977,943 A | 12/1990 | Miyabe |
| 5,003,143 A | 3/1991 | Marks et al. |
| 5,009,370 A | 4/1991 | Mackenzie |
| 5,013,458 A | 5/1991 | Christy, Sr. et al. |
| 5,023,097 A | 6/1991 | Tyson |
| 5,050,375 A | 9/1991 | Dickinson |
| 5,104,419 A | 4/1992 | Funk |
| 5,114,488 A | 5/1992 | Huber et al. |
| 5,116,363 A | 5/1992 | Romweber et al. |
| 5,119,994 A * | 6/1992 | Placzek ........................... 241/17 |
| 5,122,228 A | 6/1992 | Bouchette et al. |
| 5,143,481 A | 9/1992 | Schumacher et al. |
| 5,148,999 A | 9/1992 | Curfman et al. |
| 5,190,226 A | 3/1993 | Holloway |
| 5,196,069 A | 3/1993 | Cullingford |
| 5,196,620 A | 3/1993 | Gustin et al. |
| 5,217,688 A | 6/1993 | Von Lersner |
| 5,253,764 A | 10/1993 | Gement |
| 5,258,293 A | 11/1993 | Lynd et al. |
| 5,280,757 A | 1/1994 | Carter et al. |
| 5,300,438 A | 4/1994 | Augspurger et al. |
| 5,361,994 A | 11/1994 | Holloway |
| 5,412,881 A | 5/1995 | Romweber et al. |
| 5,427,650 A | 6/1995 | Holloway |
| 5,427,738 A | 6/1995 | Galloway |
| 5,429,645 A | 7/1995 | Benson et al. |
| 5,445,329 A | 8/1995 | Anderson |
| 5,456,553 A | 10/1995 | Il et al. |
| 5,459,071 A | 10/1995 | Finn |
| 5,480,610 A | 1/1996 | Birkholz et al. |
| 5,492,407 A | 2/1996 | Gement |
| 5,501,719 A | 3/1996 | Shida et al. |
| 5,504,259 A | 4/1996 | Diebold et al. |
| 5,534,437 A | 7/1996 | Arrau |
| 5,540,391 A | 7/1996 | Anderson |
| 5,556,445 A | 9/1996 | Quinn et al. |
| 5,587,157 A | 12/1996 | Cox et al. |
| 5,589,164 A | 12/1996 | Cox et al. |
| 5,589,391 A | 12/1996 | Fink |
| 5,602,297 A | 2/1997 | Wang |
| 5,613,306 A | 3/1997 | Romweber et al. |
| 5,615,626 A | 4/1997 | Floyd et al. |
| 5,658,097 A | 8/1997 | Komori et al. |
| 5,705,216 A | 1/1998 | Tyson |
| 5,711,817 A | 1/1998 | Titmas |
| 5,732,892 A | 3/1998 | Neier |
| 5,772,847 A | 6/1998 | Simpson et al. |
| 5,795,479 A | 8/1998 | Vogt et al. |
| 5,822,881 A | 10/1998 | Romweber et al. |
| 5,844,008 A | 12/1998 | McMillan |
| 5,879,637 A | 3/1999 | Titmas |
| 6,123,747 A | 9/2000 | Kim et al. |
| 6,197,081 B1 | 3/2001 | Schmidt |
| 6,207,015 B1 | 3/2001 | Templer et al. |
| 6,238,516 B1 | 5/2001 | Watson et al. |
| 6,245,195 B1 | 6/2001 | Marwah |
| 6,267,309 B1 | 7/2001 | Chieffalo et al. |
| 6,306,248 B1 | 10/2001 | Eley |
| 6,328,234 B1 * | 12/2001 | Saucier et al. .................... 241/1 |
| 6,379,527 B1 | 4/2002 | Vogt et al. |
| 6,397,492 B1 | 6/2002 | Malley |
| 6,409,841 B1 | 6/2002 | Lombard |
| 6,458,240 B1 | 10/2002 | Bouchette et al. |
| 6,730,223 B1 * | 5/2004 | Anderson et al. ............. 210/603 |
| 6,790,317 B2 * | 9/2004 | Antal, Jr. ......................... 201/35 |
| 7,005,555 B2 * | 2/2006 | Ding et al. ...................... 585/638 |
| 7,371,566 B1 | 5/2008 | Craven, Jr. |
| 2005/0166812 A1 | 8/2005 | Noll et al. |

FOREIGN PATENT DOCUMENTS

| | | |
|---|---|---|
| EP | 0549356 A1 | 6/1993 |
| EP | 1118706 A2 | 7/2001 |
| EP | 1700610 A2 | 9/2006 |
| GB | 809329 | 2/1959 |
| WO | 9212738 A1 | 8/1992 |
| WO | 9323167 A1 | 11/1993 |
| WO | 9426320 A1 | 11/1994 |
| WO | 9732077 A1 | 9/1997 |
| WO | 9947282 A1 | 9/1999 |
| WO | 0072987 A1 | 12/2000 |
| WO | 0224354 A1 | 3/2002 |
| WO | 03025101 A2 | 3/2003 |
| WO | 03035970 A1 | 5/2003 |
| WO | 2006015423 A1 | 2/2006 |

OTHER PUBLICATIONS

United States Patent and Trademark Office, Official Action directed to U.S. Appl. No. 11/296,586, mailed Apr. 16, 2009, 11 pages.
United States Patent and Trademark Office, Official Action directed to U.S. Appl. No. 11/355,632 mailed Feb. 19, 2009, 15 pages.
United States Patent and Trademark Office, Official Action directed to U.S. Appl. No. 11/355,632 mailed Sep. 2, 2009, 26 pages.
United States Patent and Trademark Office, Official Action directed to U.S. Appl. No. 11/355,632 mailed Sep. 2, 2009, 21 pages.
United States Patent and Trademark Office, Advisory Action directed to U.S. Appl. No. 11/355,632 mailed Sep. 17, 2009, 3 pages.
United States Patent and Trademark Office, Advisory Action directed to U.S. Appl. No. 11/355,632 mailed Dec. 30, 2009, 3 pages.
United States Patent and Trademark Office, Notice of Allowance and Fees Due directed to U.S. Appl. No. 11/355,632 mailed Feb. 17, 2010, 6 pages.

* cited by examiner

BIOMASS ENERGY PRODUCT AND PROCESSING METHOD

PRIORITY

This application is a continuation-in-part application which claims the priority date from the application entitled MSW PROCESSING VESSEL filed by Anthony Noll, et al., on Nov. 13, 2003 with application Ser. No. 10/713,557 now abandoned, the disclosure of which is incorporated herein by reference.

BACKGROUND OF THE INVENTION

1. Field of the Invention

The present invention generally relates to methods of processing MSW to produce a biomass energy product, and more specifically to a process for making a biomass energy product from the biomass processed from MSW in a heated and pressurized system.

2. Background Information

The handling of municipal solid waste (MSW) is a growing problem in the industrialized countries of the world. The more industrialized a country is, the more MSW per capita is produced. At the same time, however, less land is available for permanent placement of the MSW, and environmental regulations are becoming increasingly strict. The regulations make operating a landfill increasingly expensive and difficult, and they make opening a new landfill and closing an old one extremely expensive and difficult. All of these factors come together and make dealing with MSW a huge problem.

Any invention that reduces the amount of material that must be buried in landfills is a great benefit. Of even more benefit is an invention that turns a problematic waste stream, such as MSW, into a beneficial product.

Biomass has long been the source of fuels and chemicals. Historically, biomass has included agricultural crops, crop wastes, trees, wood waste and animal waste. Some examples of biomass include wood chips, corn, corn stalks, soybeans, grass, straw, animal waste and food-processing by-products. An untapped source of biomass is Municipal Solid Waste, MSW.

Producing fuels and chemicals from biomass is not a new concept. Cellulose, ethanol, methanol, vegetable oils and a host of other biomass-based chemicals have been in use since the 1800's to make products like paint, glue, adhesives, synthetic cloth and solvents. It was not until the 1930's and 40's that petrochemicals began to dominate the market and displace chemicals and products derived from biomass.

A goal of the invention is to create a process for making an energy product from an MSW source stream. Such a product would be useful as a bulk or loose product to burn to produce heat, steam, electricity, or to configure into a form for use in the form of pellets or briquettes. A process that uses low pressures, such as less than 15 pounds of pressure, would be advantageous because the vessel would be safer and not have to be licensed as a pressure vessel.

Another goal of the invention is to create an energy producing product, using MSW as a source, created by a process of heat and pressure and agitation.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects and goals are achieved by a method of processing an MSW feed stream into useful products, including an energy product or fuel product of the invention.

The invention is also an energy product composed of a cellulosic material, which starts as a biomass feed stream, and which is processed using the method of the invention, using a reaction vessel in the presence of heat, pressure and agitation. A reaction vessel that is suitable to achieve this purpose is that shown in U.S. patent application Ser. No. 10/703,557, which is incorporated herein by reference. The biomass can come from a number of sources, with municipal solid waste (MSW) being a commonly used feedstock. However, other feedstocks are possible including waste paper, waste cardboard, waste from food processing, waste from agriculture, waste from paper processing or other cellulose containing material, including any waste materials that include a pulpable biomass fraction. Processing the biomass in a reaction vessel results in a cellulosic material that is physically and chemically changed from the biomass feed stream.

The conversion of biomass into a fuel solves critical problems in the disposal cycle of MSW, and yields a product with a high concentration of combustible material.

Paper and paperboard products constitute about thirty-six percent of a typical MSW waste stream, and are the largest constituent in MSW. Other contents of MSW include yard trimmings (12%), food scraps (11%), plastics (11%), metals (8%), rubber, leather and textiles (7%), glass (6%), wood (6%) and others (3%). The three largest waste streams of MSW, paper, yard trimmings and food scraps, together make up about fifty-eight percent of the contents of MSW. All contain carbon and carbohydrates in fibrous configurations. These fibrous configurations can be broken down by heat, pressure and agitation, and separated from other components in MSW, to form a high carbon product, made of fibers that are shorter and of chemically simpler composition than the original products. This product has been found to be an excellent energy product.

The process of producing an energy product of the invention utilizes steam at less than fifteen pounds to supply heat and pressure to the reaction vessel. This is typically maintained for approximately forty-five minutes, although longer and shorter times still fall within the concept of the invention as described in the claims.

The heat, pressure, and agitation that are supplied in the reaction vessel to the biomass stream result in reduced crystallinity of the biomass. It also can result in chemical reduction of the hemicellulose content to simpler derivatives of hemicellulose.

The invention also includes the method of making an energy product from the biomass. The biomass would typically be from MSW, but other biomass streams are also suitable to this method. The method includes the steps of adding a quantity of the selected biomass to a reaction vessel that is configured for agitation of the materials. Agitation can be in the form of paddles, broken or continuous, that are affixed to the inside of the rotating reaction vessel. Typically, auger vanes mounted permanently on the inside of the reaction vessel will aid in agitating the biomass and moving it in one direction or the other. The next step is to close the reaction vessel, and begin rotation of the vessel. Next the vessel is purged of ambient air using injected steam while rotation continues. The vessel is then sealed and rotation continues or other agitation may be initiated while adding steam through one or more steam injection ports in the vessel. The pressure inside the vessel is intended to be less than 15 psi. The vessel is rotated and heated for approximately forty-five or more minutes while injecting steam through one or more injection inlets. The next step is to depressurize the vessel, which includes condensing the atmosphere from the vessel in a condensation unit to trap off gases and odors. The next step is to open the door of the reactor and move the treated biomass from the reaction vessel. This is typically accomplished by rotation of the reaction vessel and by action of auger vanes within the reaction vessel. Next, the treated biomass is cooled. The next step is separating the cellulosic fraction of the treated biomass from other fractions.

The reaction vessel utilized with this method is typically a cylindrical vessel, which has internally mounted auger flights or vanes that aid in agitation, physical destruction, and moving of the biomass inside the reaction vessel. Typically, one or more steam inlets are utilized to add steam pressure and heat to the reaction vessel.

In one version of the process of making the energy product of the invention, the steam and gases from inside the reaction vessel are evacuated through a barometric condenser before removing the treated biomass from the reaction vessel in order to reduce escaping emissions from the heated biomass.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
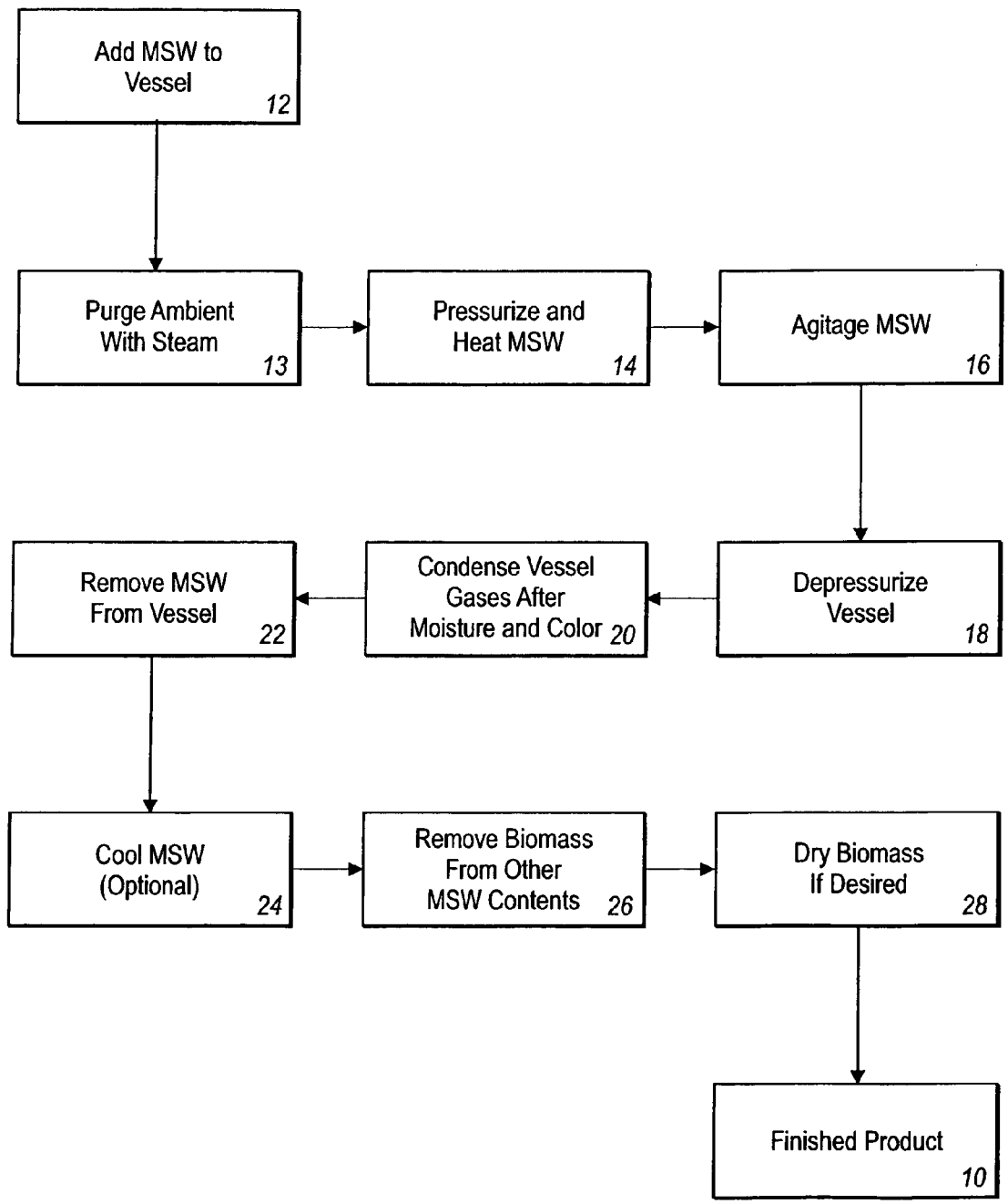
FIG. 1 is a flow chart showing the processing of MSW to biomass for use as an energy product.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In 2001, 229 million tons of MSW were generated. Of that quantity, the approximate breakdown of constituents is as follows:

| | |
|---|---|
| Paper | 35.7% |
| Yard Trimmings | 12.2% |
| Food Scraps | 11.4% |
| Plastics | 11.1% |
| Metals | 7.9% |
| Rubber, leather and textiles | 7.1% |
| Glass | 5.5% |
| Wood | 5.7% |
| Other | 3.4% |

In order to reduce the generation of MSW, the EPA has identified several strategies. The most preferred is source reduction, followed by recycling and composting. The least desirable ways to deal with MSW is combustion in combustion facilities and placement in landfills. Pyrolysis, also called plasma arc, is one method of combustion. It is a method that exposes material to temperatures of 10,000 degrees centigrade or higher. This chemically decomposes any organic matter present. CO and $CO_2$ are released in the process. A pyrolysis unit can be relatively small and can be mounted on a truck. The disadvantage is that this technology is very costly at present.

The present invention has the advantage of being a recycling method in that it separates the cellulose fiber portion of the waste and recycles it to a useful purpose. This is unusual in the waste recycling process, because recycling is usually referred to as recycling of metal products, glass and plastics. At present there is very little or no recycling of paper or cellulose fiber containing material from disposal bound waste, which make up the three largest waste streams found in MSW. Unprocessed municipal solid waste typically can't be used as an energy source, because of the presence of contaminated plastics and heavy metals. Removing the biomass from the plastics and metals streams has always been the problem with incinerating MSW, and accomplishing this separation makes an MSW based energy product a renewable energy resource.

Figure 2:
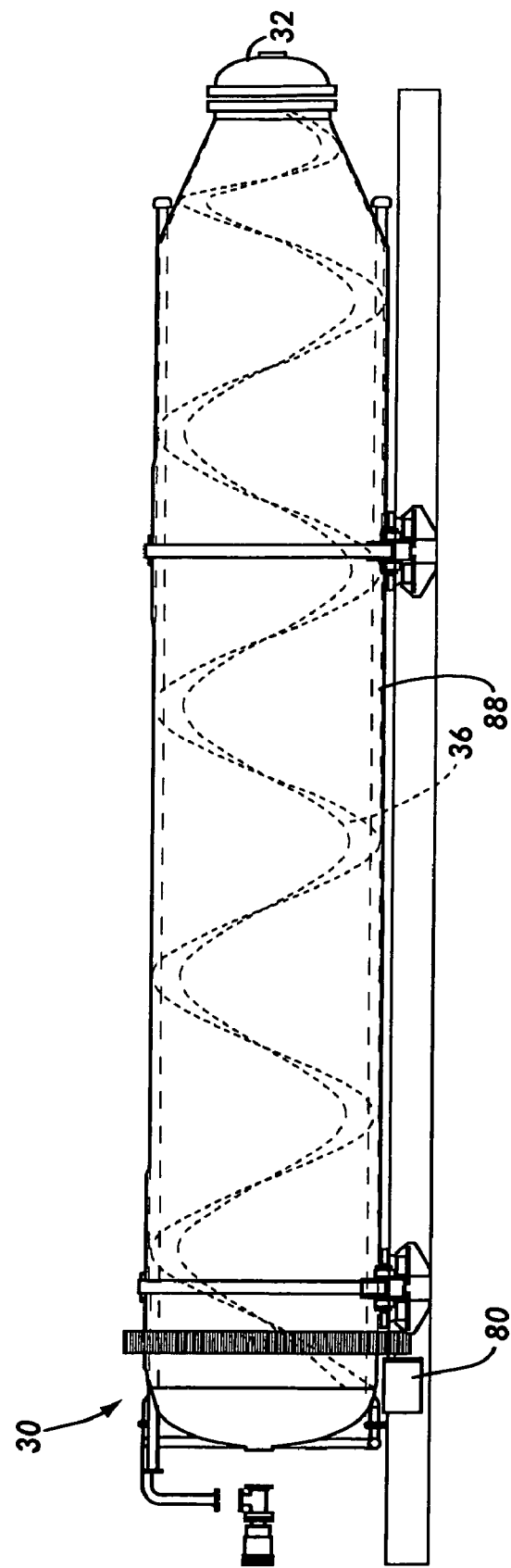
FIG. 2 is a side view of a vessel suitable for processing MSW into An energy product.

The preferred form of the method of the invention is to place a quantity of MSW in a reaction vessel as shown in FIG. 2. The steps of this process are shown in FIG. 1.

The biomass would typically be from MSW, but other biomass streams are also suitable to this method. These possible waste streams include streams from agricultural processes, paper processing, food processing, or any activity that results in a high cellulose fraction in a waste stream. The preferred method includes the step at block 12 of adding a quantity of the selected biomass to a reaction vessel that is configured for agitation of the materials. At block 13 the ambient air inside the vessel is purged using steam. If desired the ambient air can be recovered and scrubbed to prevent the release of off gases and odors.

Agitation is preferably in the form of paddles, broken or continuous, that are affixed to the inside of the rotating reaction vessel. Typically, auger vanes mounted permanently on the inside of the reaction vessel are used to aid in agitation of the biomass and moving it in one direction or the other. The next step is to close the reaction vessel, and begin rotation of the vessel. Next the vessel is purged of ambient air using injected steam while rotation continues. The vessel is then sealed and rotation continues or other agitation may be initiated while adding steam through one or more steam injection ports in the vessel. At block 14, the pressure inside the vessel is intended to be less than 15 psi. The vessel is rotated and heated for approximately forty-five or more minutes while injecting steam through one or more injection inlets. The vessel is rotated (block 16) and heated for approximately forty-five or more minutes while injecting steam through one or more injection inlets. The next step is to depressurize the vessel (block 18), which includes condensing the atmosphere from the vessel in a condensation unit to trap off-gases and odors (block 20). The next step is to open the door of the reactor and move the treated biomass from the reaction vessel (block 22). This is typically accomplished by rotation of the reaction vessel and by action of auger vanes within the reaction vessel. Next, the treated biomass is cooled to a temperature selected for the next step in the process that is selected (block 24). The next step is separating the cellulosic fraction of the treated biomass from other fractions (block 26). This could include larger pieces of wood and tree branches. The next step is typically to dry the biomass to the desired moisture level appropriate for the final use of the biomass, shown in block 28. The resultant finished product is shown at 10 or FIG. 1.

The reaction vessel utilized with this method is typically a cylindrical vessel which has internally mounted auger flights or vanes that aid in agitation, physical destruction, and moving of the biomass inside the reaction vessel. Typically, one or more steam inlet lines are utilized to add steam pressure and heat to the reaction vessel. The entire vessel is designed for rotation, and a vessel similar to that disclosed in U.S. patent application Ser. No. 10/703,557 is suitable for this process, and is incorporated herein by reference.

The step shown at 20, of routing the steam and gases from inside the reaction vessel through a barometric condenser before removing the treated biomass from the reaction vessel serves the purpose of reducing emissions from the heated biomass, and is a desirable but optional step.

The preferred form of the invention is to place a quantity of MSW in a reaction vessel as shown in FIG. 2. The reaction vessel utilized with this method is typically a cylindrical vessel 30, which has internally mounted auger flights or vanes 36 that aid in agitation, physical destruction, and moving of the biomass inside the reaction vessel. Typically, one or more steam inlet lines 88 are utilized to add steam pressure and heat to the reaction vessel. The entire vessel is designed for rotation by a motor 80 with a door 32 at one end. A vessel similar to that disclosed in U.S. patent application Ser. No. 10/713,557 is suitable for this process, and is incorporated herein by reference.

The product that results from treating MSW in such a vessel has a reduced particle size compared to the MSW from which it originated. This results partly from physical shredding of all fiber materials, but more importantly from chemical change of the pulp and paper fractions within MSW. Thus the steam and pressure process produces a homogeneous cellulosic end product derived solely from the paper and pulp portion of MSW. The cellulosic biomass product thus formed is different in its basic molecular structure and chemical characteristic from the original MSW. It is a fluffy product, which when wet is somewhat like wet oatmeal. It has an increased surface area compared to the original fibrous portion of MSW. It also has a reduced fiber length and crystallinity of cellulose fibers compared to the MSW source. Additionally, the hemicellulosic content is lower in the cellulosic biomass than in the MSW from which it is derived. Any water soluble portions of the MSW are dissolved and largely removed. Some MSW waste streams will contain articles of plastic which may be deliberately allowed to remain in the end product, and can add BTUs to the energy product of the invention. In this way the biomass energy product may be supplemented by the inclusion of other combustible products or other additives which may improve or increase the qualities of the resulting product.

Use of biomass for an energy product can replace imported petrochemicals and alleviate the shortage of landfill space. Biomass is an attractive alternative to energy sources from foreign sources, and could be ramped up to in production to respond to future shortages and increased cost of petrochemicals.

The energy product thus produced is useful as an energy source in a variety of ways. It can be handled as a bulk or loose energy fuel, can be packaged in bales, or in forms and shapes such as pellets, briquettes, or other forms. Whatever form the product is in, it can be burned to produce space heat, steam, and electricity. Use of this fuel instead of coal or oil results in less $CO_2$ release into the atmosphere and reduced release of acid rain constituents. It also reduces pressure on landfills and leaves the metal, glass and rubber components of the waste stream more easily accessible for sorting and recycling.

An analysis of product exiting a reaction vessel after heat, pressure and agitation shows the following composition:

| Method | Parameter | Result | Units |
|---|---|---|---|
| EPA 160.4 | Organic Matter (550 C.) | 74.1 | % |
| EPA/CE-81-1 | Total Nitrogen (N) | 11000 | mg/Kg |
| EPA/CE-81-1 | Phosphorus, Total (P) | 2678 | mg/Kg |
| EPA 7610 | Potassium (K) | 2590 | mg/Kg |
| EPA 7130 | Cadmium (Cd) | 2 d | mg/Kg |
| EPA 7210 | Copper (Cu) | 75 | mg/Kg |
| EPA 7420 | Lead (Pb) | 118 | mg/Kg |
| EPA 7520 | Nickel (Ni) | 66 | mg/Kg |
| EPA 7950 | Zinc (Zn) | 722 | mg/Kg |
| Screen Test | Foreign Matter, Retained on ¼" Screen | 22.59 | % |
| Screen Test | Bones, % of total compost | 0 | % |
| Screen Test | Glass, % of total compost | 22.57 | % |
| Screen Test | Leather, % of total compost | 0 | % |
| Screen Test | Metal, % of total compost | 12.87 | % |
| Screen Test | Plastic, % of total compost | 1.76 | % |
| Screen Test | Rubber, % of total compost | 0 | % |
| Screen Test | Other, % of total compost | 62.80 | % |
| Screen Test | Foreign Matter, Retained on ¼" Screen | 22.96 | % |
| Screen Test | Bones, % of total compost | 0 | % |
| Screen Test | Glass, % of total compost | 23.00 | % |
| Screen Test | Leather, % of total compost | 0 | % |
| Screen Test | Metal, % of total compost | 1.40 | % |
| Screen Test | Plastic, % of total compost | 2.26 | % |
| Screen Test | Rubber, % of total compost | 0 | % |
| Screen Test | Other, % of total compost | 73.34 | % |
| SM9221E | Fecal Coliform (MPN)/gm. Dry Weight | >160 | |
| SM9221E | Date and time started | 0826 1330 | |
| SM9221E | Fecal Coliform (MPN)/gm. Dry Weight | >160 | |
| SM9221E | Date and time started | 0826 1330 | |

By burning cellulosic biomass in place of fossil fuels for energy generation, the $CO_2$ from oil burning is not released into the atmosphere. The $CO_2$ released by burning the cellulosic biomass would have been released into the atmosphere as the biomass decomposes, so there is a net reduction of $CO_2$ quantity released into the atmosphere. To use the treated biomass product for energy, it is preferably dried, and compacted into a form suitable for burning or as a free flowing solid for controlled feeding into furnaces or in other desired forms. The fuel material can be used to produce heat, to produce electricity, to heat steam for building heating, or other typical uses a burning fuel provides.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

We claim:

1. A method for creating an energy product from the cellulosic fraction of biomass, which comprises the steps of:
   adding biomass to a sealable reaction vessel;
   rotating said reaction vessel while adding steam at 15 psig or less to said biomass; and
   separating a cellulosic fraction of the treated biomass from other fractions of the treated biomass to thus form a combustible energy product.

2. The method for creating an energy product from the cellulosic fraction of biomass of claim 1, which further includes the step of agitating the biomass in the reaction chamber by rotation of the reaction vessel and by action of auger vanes within said reaction vessel.

3. The method for creating an energy product from the cellulosic fraction of biomass of claim 1, which includes the step of providing a reaction chamber with an access door at one end, with a door cover which may be sealed on said access door during the heating and pressure step, and unsealed from said access door for input and removal of biomass.

4. The method for creating an energy product from the cellulosic fraction of biomass of claim 1, which further includes the step of cooling the treated biomass after removal from the reactor.

5. The method for creating an energy product from the cellulosic fraction of biomass of claim 1, which further includes the step of providing a condensation chamber for said reaction vessel, in which gases from said reaction chamber may be routed and condensed to remove odors and off-gas before the biomass is discharged from the reaction vessel.

6. The method for creating an energy product from the cellulosic fraction of biomass of claim 1, which further includes the step of rotating the reaction vessel and heating the biomass for approximately 45 minutes or less by injecting steam through one or more sparging lines associated with said reaction vessel.

7. The method for creating an energy product of claim 1, which includes the step of adding said biomass to a generally cylindrical reaction vessel with internal auger flights for agitation and moving of said biomass.

8. The method for creating an energy product from the cellulosic fraction of biomass of claim 1 wherein the vessel is configured for agitation of said biomass and further includes the step of closing the reaction vessel.

9. The method for creating an energy product from the cellulosic fraction of biomass of claim 1, wherein the steam is added to the biomass while the biomass is being agitated in the reaction vessel.

10. The method for creating an energy product from the cellulosic fraction of biomass of claim 1 further including the step of unsealing the reaction vessel and removing the treated biomass from the reaction vessel.

11. A method of separating cellulosic biomass from biomass waste streams, which comprises the steps of:
    adding biomass to a sealable reaction vessel;
    rotating said reaction vessel while adding steam at 15 psig or less to said biomass and
    separating the cellulosic fraction of the treated biomass from other fractions of the treated biomass.

12. The method of separating cellulosic biomass from biomass waste streams of claim 11, which further includes the step of agitating the biomass in the reaction chamber by rotation of the reaction vessel and by action of auger vanes within said reaction vessel.

13. The method of separating cellulosic biomass from biomass waste streams of claim 11, which includes the step of providing a reaction chamber with an access door at one end, with a door cover which may be sealed on said access door during the heating and pressure step, and unsealed from said access door for input and removal of biomass.

14. The method of separating cellulosic biomass from biomass waste streams of claim 11, which further includes the step of cooling the treated biomass after removal from the reactor.

15. The method of separating cellulosic biomass from biomass waste streams of claim 11, which further includes the step of providing a condensation chamber for said reaction vessel, in which gases from said reaction chamber may be routed and condensed to remove odors and off-gas before the biomass is discharged from the reaction vessel.

16. The method of separating cellulosic biomass from biomass waste streams of claim 11, which further includes the step of rotating the reaction vessel and heating the biomass for approximately 45 minutes or less by injecting steam through one or more sparging lines associated with said reaction vessel.

17. The method of separating cellulosic biomass from biomass waste streams of claim 11, which includes the step of adding said biomass to a generally cylindrical reaction vessel with internal auger flights for agitation and moving of said biomass.

18. The method of separating cellulosic biomass from biomass waste streams of claim 11, further comprising forming said cellulosic pulp into an energy product.

19. The method of separating cellulosic biomass from biomass waste streams of claim 18 wherein said energy product is formed by compressing said cellulosic biomass into a selected shape for combustion.

20. The method for creating an energy product from the cellulosic fraction of biomass of claim 11 wherein the vessel is configured for agitation of said biomass and further includes the step of closing the reaction vessel.

21. The method for creating an energy product from the cellulosic fraction of biomass of claim 11, wherein the steam is added to the biomass while the biomass is being agitated in the reaction vessel.

22. The method for creating an energy product from the cellulosic fraction of biomass of claim 11 further including the step of unsealing the reaction vessel and removing the treated biomass from the reaction vessel.

* * * * *